United States Patent
Hoshino

(10) Patent No.: US 10,826,327 B2
(45) Date of Patent: Nov. 3, 2020

(54) POWER FEEDING SYSTEM AND POWER FEEDING METHOD

(71) Applicant: ABLIC Inc., Chiba-shi, Chiba (JP)

(72) Inventor: Masafumi Hoshino, Chiba (JP)

(73) Assignee: ABLIC INC., Chiba (JP)

( * ) Notice: Subject to any disclaimer, the term of this patent is extended or adjusted under 35 U.S.C. 154(b) by 170 days.

(21) Appl. No.: 16/135,479

(22) Filed: Sep. 19, 2018

(65) Prior Publication Data
US 2019/0089198 A1    Mar. 21, 2019

(30) Foreign Application Priority Data

Sep. 20, 2017  (JP) .................. 2017-180147

(51) Int. Cl.
  *H02J 50/12* (2016.01)
  *H02J 50/90* (2016.01)
  *H02J 50/60* (2016.01)

(52) U.S. Cl.
  CPC .............. *H02J 50/12* (2016.02); *H02J 50/90* (2016.02); *H02J 50/60* (2016.02)

(58) Field of Classification Search
  CPC ......... H02J 50/12; H02J 50/90; H01F 27/255; H01F 38/14; H01F 27/306; H01F 27/24
  See application file for complete search history.

(56) References Cited

U.S. PATENT DOCUMENTS

| | | | | |
|---|---|---|---|---|
| 5,293,308 A | * | 3/1994 | Boys | H02J 7/00712 363/37 |
| 2015/0091387 A1 | * | 4/2015 | Okazaki | H02J 50/60 307/104 |
| 2017/0170688 A1 | * | 6/2017 | Maniktala | H02J 7/025 |
| 2018/0337557 A1 | * | 11/2018 | Chen | H02J 7/00045 |

FOREIGN PATENT DOCUMENTS

JP        2010-183706 A        8/2010

* cited by examiner

*Primary Examiner* — Daniel J Cavallari
(74) *Attorney, Agent, or Firm* — Brinks Gilson & Lione

(57) ABSTRACT

Provided is a power feeding system configured to supply electric power from a power feeding device to a power receiving device. The power feeding device includes: a feeding coil; a drive transistor; and a drive control circuit. The power receiving device includes: a resonant circuit including a receiving coil, a resonant capacitor, and a resonance control transistor; and a resonance control circuit. The feeding coil and the receiving coil are arranged so that a central axis of the feeding coil and a central axis of the receiving coil are orthogonal to each other, and a winding portion of the receiving coil is not positioned in a region of a magnetic flux parallel to the central axis of the feeding coil which is generated by the feeding coil.

8 Claims, 12 Drawing Sheets

POWER FEEDING SYSTEM AND POWER FEEDING METHOD

RELATED APPLICATIONS

This application claims priority under 35 U.S.C. § 119 to Japanese Patent Application No. 2017-180147 filed on Sep. 20, 2017, the entire content of which is hereby incorporated by reference.

BACKGROUND OF THE INVENTION

1. Field of the Invention

The present invention relates to a power feeding system and a power feeding method.

2. Description of the Related Art

In recent years, there has been known a power feeding system configured to carry out wireless supply of electric power through electromagnetic induction or electromagnetic coupling between a feeding coil and a receiving coil (see, for example, Japanese Patent Application Laid-open No. 2010-183706).

In the technology of Japanese Patent Application Laid-open No. 2010-183706, a plurality of devices with a built-in battery each including a power receiving device are mounted on a charging station (power feeding device), the positions of the devices with a built-in battery are detected, and a power transmission coil (feeding coil) moves to supply electric power to the devices with a built-in battery, to thereby charge the batteries. The charging station is configured to successively move the power transmission coil (feeding coil) with respect to the plurality of devices with a built-in battery to charge the batteries.

However, in Japanese Patent Application Laid-open No. 2010-183706, electric power cannot be simultaneously supplied to the plurality of devices. In addition, complicated configurations, such as a position detecting function for the power receiving device and a moving mechanism for the feeding coil, are indispensable.

SUMMARY OF THE INVENTION

An object of the present invention is to provide a power feeding system and a power feeding method which enable simultaneous electric power supply to a plurality of power receiving devices through use of a simple configuration.

In order to solve the above-mentioned problem, according to one embodiment of the present invention, there is provided a power feeding system including: a power feeding device; and a power receiving device, the power feeding system being configured to supply electric power from the power feeding device to the power receiving device through electromagnetic induction, the power feeding device including: a feeding coil, the feeding coil being a winding coil; a first switching element connected in series to the feeding coil and is periodically switched between a conductive state and a non-conductive state with a drive signal for driving the feeding coil; and a drive control circuit configured to determine whether to supply electric power to the power receiving device based on a variation of a periodic waveform in an excited voltage excited by the feeding coil and to control the first switching element based on a result of the determination, the power receiving device including: a resonant circuit having: a receiving coil including a magnetic core, and configured to receive the electric power from the feeding coil; a resonant capacitor configured to resonate with the receiving coil; and a second switching element configured to control switching between a resonant state and a non-resonant state of the resonant circuit by changing an electrical connection state of the resonant capacitor; and a resonance control circuit configured to control the second switching element so that the variation of the periodic waveform occurs in the excited voltage by switching between the resonant state and the non-resonant state of the resonant circuit, the feeding coil and the receiving coil being arranged so that a central axis of the feeding coil and a central axis of the receiving coil are orthogonal to each other, and a winding portion of the receiving coil is prevented from being positioned in a region of a magnetic flux parallel to the central axis of the feeding coil which is generated by the feeding coil.

Further, according to one embodiment of the present invention, there is provided a power feeding method for a power feeding system, the power feeding system including a power feeding device and a power receiving device, the power feeding system being configured to supply electric power from the power feeding device to the power receiving device through electromagnetic induction, the power feeding device including: a feeding coil, the feeding coil being a winding coil; and a first switching element connected in series to the feeding coil, and periodically switched between a conductive state and a non-conductive state with a drive signal for driving the feeding coil, the power receiving device including a resonant circuit having: a receiving coil including a magnetic core and configured to receive the electric power from the feeding coil; a resonant capacitor configured to resonate with the receiving coil; and a second switching element configured to control switching between a resonant state and a non-resonant state of the resonant circuit by changing an electrical connection state of the resonant capacitor, the power feeding method comprising: arranging the feeding coil and the receiving coil so that a central axis of the feeding coil and a central axis of the receiving coil are orthogonal to each other, and a winding portion of the receiving coil is not positioned in a region of a magnetic flux generated by the feeding coil and parallel to the central axis of the feeding coil; causing the power feeding device to determine whether to supply electric power to the power receiving device based on a variation of a periodic waveform in an excited voltage excited by the feeding coil and to control the first switching element based on a result of the determination; and causing the power receiving device to control the second switching element so that the variation of the periodic waveform occurs in the excited voltage by switching between the resonant state and the non-resonant state of the resonant circuit.

According to the present invention, it is possible to simultaneously supply electric power to a plurality of power receiving devices with a simple configuration.

DETAILED DESCRIPTION OF THE PREFERRED EMBODIMENTS

Now, a power feeding system according to one embodiment of the present invention is described with reference to the drawings.

First Embodiment

Figure 1:
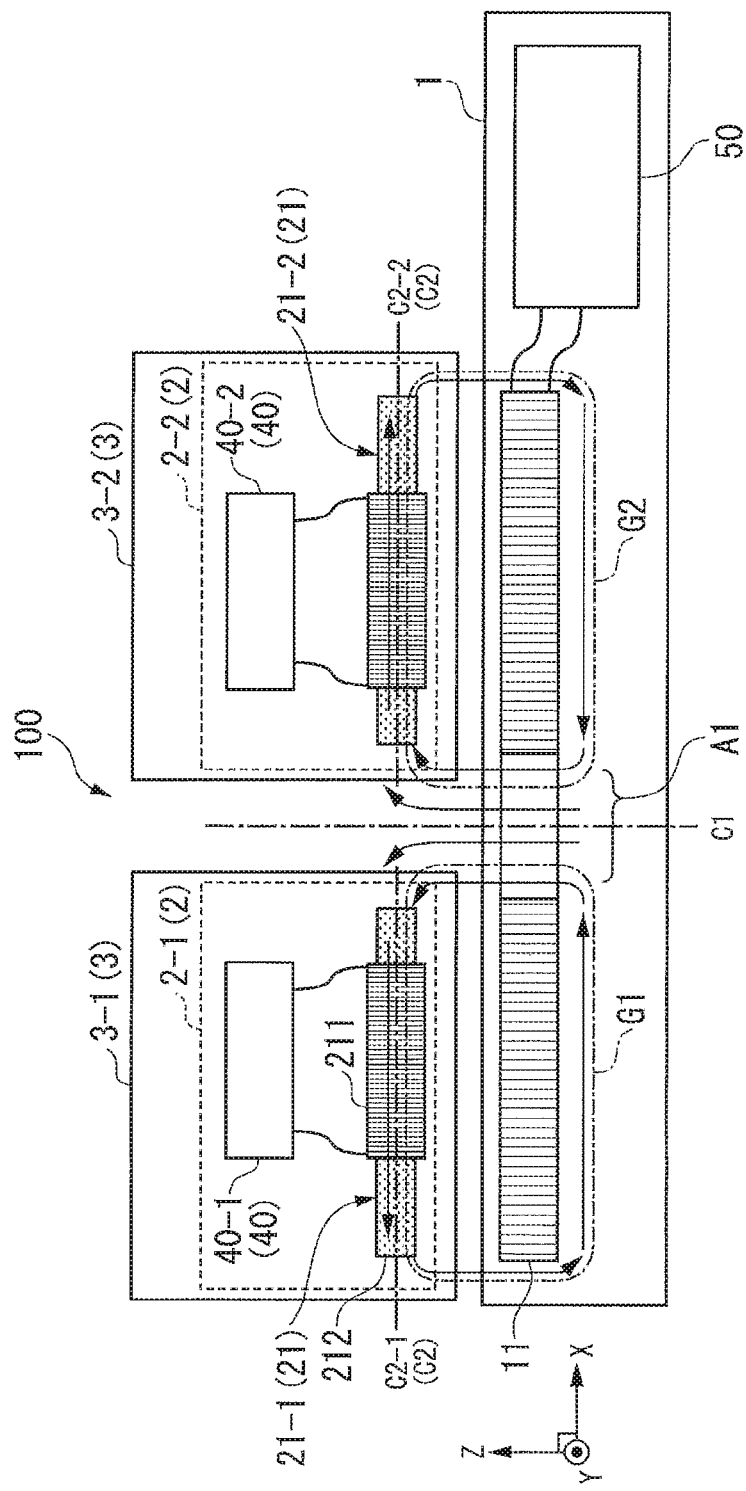
FIG. 1 is a configuration view for illustrating an example of a power feeding system according to a first embodiment of the present invention.

FIG. 1 is a configuration view for illustrating an example of a power feeding system 100 according to a first embodiment of the present invention.

As illustrated in FIG. 1, the power feeding system 100 includes a power feeding device 1, an electronic device 3-1 including a power receiving device 2-1, and an electronic device 3-2 including a power receiving device 2-2.

In the first embodiment, the power receiving device 2-1 and the power receiving device 2-2 have the same configuration. In case an arbitrary power receiving device included in the power feeding system 100 is referred to or in case the power receiving device 2-1 and the power receiving device 2-2 are not particularly distinguished, the power receiving devices 2-1 and 2-2 are collectively described as a power receiving device 2.

Further, in the first embodiment, the electronic device 3-1 and the electronic device 3-2 have the same configuration. In case an arbitrary electronic device included in the power feeding system 100 is referred to or in case the electronic device 3-1 and the electronic device 3-2 are not particularly distinguished, the electronic device 3-1 and the electronic device 3-2 are collectively described as an electronic device 3.

Further, in an example illustrated in FIG. 1, the power feeding system 100 supplies electric power to two electronic devices 3 (two power receiving devices 2), and it is only necessary that the power feeding system 100 include at least one electronic device 3 (power receiving device 2).

The power feeding system 100 supplies electric power from the power feeding device 1 to the power receiving device 2 through electromagnetic induction.

The power feeding device 1 includes a feeding coil 11 and a power feeding circuit 50.

The feeding coil 11 is, for example, a plate-like winding coil having a central axis C1 as a central axis and supplies (feeds) electric power to a receiving coil 21 described later through electromagnetic induction.

The power feeding circuit 50 generates a drive signal for driving the feeding coil 11. The detailed configuration of the power feeding circuit 50 is described later.

The power receiving device 2 includes the receiving coil 21 and a power receiving circuit 40. In FIG. 1, the receiving coil 21 and the power receiving circuit 40 included in the power receiving device 2-1 are defined as a receiving coil 21-1 and a power receiving circuit 40-1, and the receiving coil 21 and the power receiving circuit 40 included in the power receiving device 2-2 are defined as a receiving coil 21-2 and a power receiving circuit 40-2.

The receiving coil 21 is, for example, a solenoid coil including a winding portion 211 and a bar-shaped ferrite core 212 (an example of a bar-shaped magnetic core) and receives electric power from the feeding coil 11.

The power receiving circuit 40 converts the electric power supplied from the feeding coil 11 to the receiving coil 21 into DC power and supplies the DC power to a load 26 described later (see FIG. 3). The detailed configuration of the power receiving circuit 40 is described later.

In FIG. 1, the positional relationship between the feeding coil 11 and the receiving coils 21 is illustrated. In FIG. 1, the positional relationship between the feeding coil 11 and the receiving coils 21 is described through use of an XYZ orthogonal system. Description is given by defining a direction parallel to the central axis C1 of the feeding coil 11 (central axis of a winding) as a Z-axis direction, a right-and-left direction of the drawing sheet as an X-axis direction, and a front-and-back direction of the drawing sheet as a Y-axis direction.

As illustrated in FIG. 1, the receiving coil 21 is arranged, for example, so that a central axis C2 of the receiving coil 21 (central axis of a winding) is parallel to the X-axis direction. That is, the feeding coil 11 and the receiving coil 21 are arranged so that the central axis C1 of the feeding coil 11 and the central axis C2 of the receiving coil 21 are orthogonal to each other. Further, the receiving coil 21 is arranged so that a winding portion of the solenoid coil (winding portion 211) is not positioned in a region (region A1) of a magnetic flux parallel to the central axis C1 of the feeding coil 11 which is generated by the feeding coil 11.

The magnetic flux generated in the region A1 passes through the bar-shaped ferrite core 212 of the receiving coil 21 to return to the region A1 through an outer side of the feeding coil 11. In this manner, the receiving coil 21 is arranged at a position away from the feeding coil 11 in the Z-axis direction, a magnetic circuit G1 (G2) is formed, and electric power is supplied from the feeding coil 11 to the receiving coil 21 through electromagnetic induction. That is, the receiving coil 21 is arranged so that the bar-shaped ferrite core 211 and the feeding coil 11 form the magnetic circuit G1 (G2).

Further, the feeding coil 11 in the first embodiment can simultaneously supply electric power to two receiving coils 21 including the receiving coil 21-1 and the receiving coil 21-2.

Figure 2:
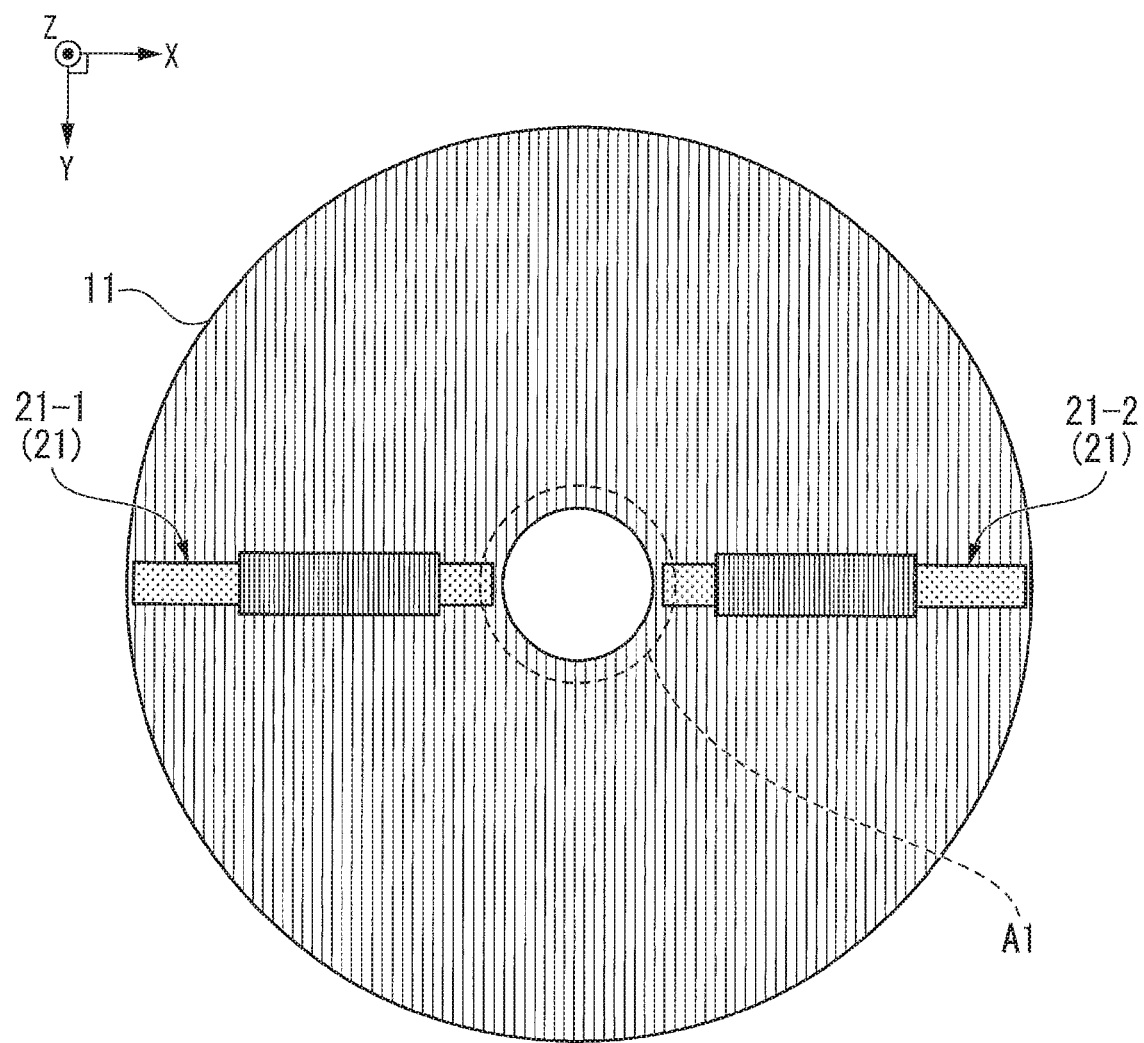
FIG. 2 is a view for illustrating an arrangement example of a feeding coil and receiving coils in the first embodiment.

Further, FIG. 2 is a view for illustrating an arrangement example of the feeding coil 11 and the receiving coils 21 in the first embodiment. In this case, description is given of the arrangement of the feeding coil 11 and the receiving coils 21 viewed from the Z-axis direction.

In FIG. 2, the feeding coil 11 is arranged so that an XY plane coincides with a plane of the winding, and the receiving coil 21-1 and the receiving coil 21-2 are arranged so that the bar-shaped ferrite cores 212 are positioned radially from the center of the feeding coil 11. Further, the receiving coil 21-1 and the receiving coil 21-2 are each arranged so that the winding portion 211 of the solenoid coil is not positioned in the region (region A1) of the magnetic flux parallel to the central axis C1 of the feeding coil 11 described above.

The receiving coil 21-1 and the receiving coil 21-2 each have a length of, for example, about a half (½) of a diameter of the feeding coil 11.

Next, the detailed configuration of the power feeding system 100 according to the first embodiment including the power receiving circuit 40 and the power feeding circuit 50 is described with reference to FIG. 3.

Figure 3:
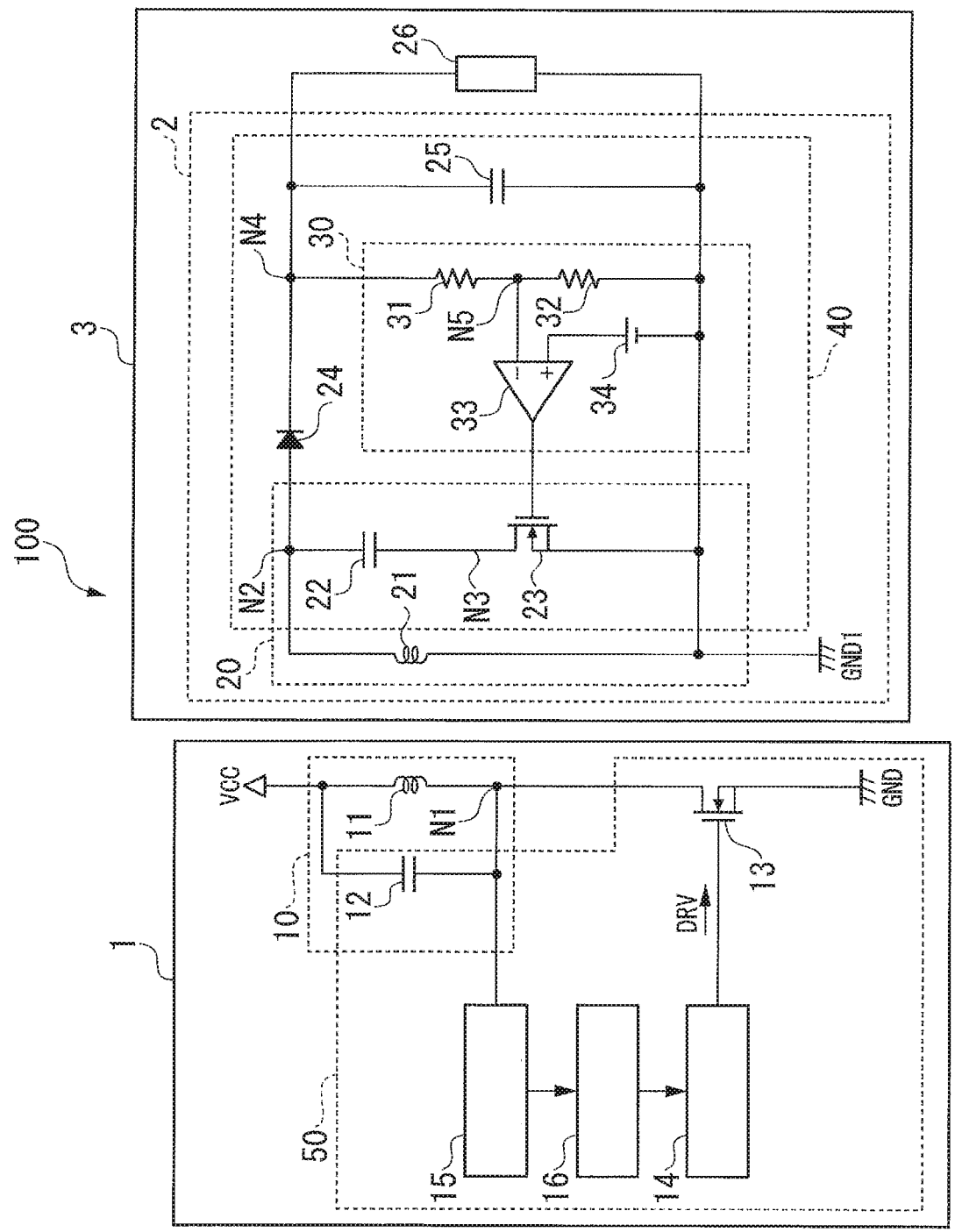
FIG. 3 is a block diagram for illustrating an example of the power feeding system according to the first embodiment.

FIG. 3 is a block diagram for illustrating an example of the power feeding system 100 according to the first embodiment.

As illustrated in FIG. 3, the power feeding system 100 includes the power feeding device 1 and the electronic device 3 including the power receiving device 2.

The power feeding system 100 is configured to carry out wireless supply of electric power from the power feeding device 1 to the power receiving device 2 (in a non-contact manner). For example, the power feeding system 100 supplies electric power for operating the load 26 included in the power receiving device 2 from the power feeding device 1 to the power receiving device 2.

The electronic device 3 is, for example, a mobile phone terminal or a personal digital assistant (PDA), and includes the power receiving device 2 and the load 26. Further, the power feeding device 1 may, for example, be a charger compatible with the power receiving device 2.

The power feeding device 1 includes the feeding coil 11, a resonant capacitor 12, a drive transistor 13, a drive signal generation circuit 14, a crest value variation detection circuit 15, and a drive control circuit 16. In this case, the resonant capacitor 12, the drive transistor 13, the drive signal generation circuit 14, the crest value variation detection circuit 15, and the drive control circuit 16 are included in the power feeding circuit 50.

The feeding coil 11 has a first terminal connected to a power supply VCC, and a second terminal connected to a node N1. The feeding coil 11 is a coil configured to supply electric power to the receiving coil 21 included in the power receiving device 2 through, for example, electromagnetic induction or electromagnetic coupling. For supplying electric power to the power receiving device 2, the feeding coil 11 is arranged with respect to the receiving coil 21 as illustrated in FIG. 1 and FIG. 2 described above to supply electric power to the receiving coil 21 through electromagnetic induction. The feeding coil 11 can simultaneously supply electric power to a plurality of (for example, two) power receiving devices 2 (receiving coils 21).

The resonant capacitor 12 is a capacitor that is connected in parallel to the feeding coil 11, and resonates with the feeding coil 11. The feeding coil 11 and the resonant capacitor 12 form a resonant circuit 10. The resonant circuit 10 resonates at a predetermined resonant frequency (for example, 100 kHz (kilohertz)) determined by an inductance of the feeding coil 11 and a capacitance of the resonant capacitor 12.

The drive transistor 13 (an example of a first switching element) is, for example, a field effect transistor (FET), and is connected in series to the resonant circuit 10. In the first embodiment, the case in which the drive transistor 13 is an N-channel metal oxide semiconductor (MOS) FET is described as an example. In the following, "MOSFET" is sometimes referred to as a MOS transistor, and "N-channel MOS transistor" is sometimes referred to as an NMOS transistor.

Specifically, the drive transistor 13 has a source terminal connected to a power supply GND, a gate terminal connected to an output signal line of the drive signal generation circuit 14, and a drain terminal connected to the node N1. The drive transistor 13 periodically repeats an ON state (conductive state) and an OFF state (non-conductive state) with a drive signal DRV generated by the drive signal generation circuit 14. Thus, the drive transistor 13 is periodically switched between an ON state and an OFF state with the drive signal DRV for driving the feeding coil 11. Since supply and release of electric power to and from the resonant circuit 10 are repeated by the switching operation of the drive transistor 13, a periodic signal is generated in the feeding coil 11, and electric power is supplied from the feeding coil 11 to the receiving coil 21 through electromagnetic induction.

The drive signal generation circuit 14 generates the drive signal DRV for driving the feeding coil 11, by switching the drive transistor 13 between the ON state and the OFF state. As used herein, the drive signal DRV is a signal for periodically switching the drive transistor 13 between the ON state and the OFF state. The drive signal generation circuit 14 generates the drive signal DRV for periodically controlling the ON state/OFF state of the drive transistor 13. Further, the drive signal generation circuit 14 provides the drive signal DRV or stops providing the drive signal DRV based on the control signal supplied from the drive control circuit 16.

The crest value variation detection circuit 15 (example of a variation detection circuit) detects a change due to switching between a resonant state and a non-resonant state of a resonant circuit 20 of the power receiving device 2 which occurs in relation to a connection state of a resonant capacitor 22 of the power receiving device 2 to be described later as a variation of the periodic waveform in an excited voltage which is excited by the feeding coil 11. The variation of the periodic waveform includes a variation in peak voltage of the excited voltage. In the first embodiment, the crest value variation detection circuit 15 detects the change in resonant state of the resonant circuit 20 of the power receiving device 2 as the variation in peak voltage of the excited voltage which is excited by the feeding coil 11. The crest value variation detection circuit 15 provides detection results of the variation in peak voltage to the drive control circuit 16.

The crest value variation detection circuit 15 holds the peak voltage excited by the feeding coil 11, for example, through use of a sample-and-hold circuit, to thereby detect the variation in peak voltage.

The drive control circuit 16 makes the drive signal generation circuit 14 supply the drive signal DRV to the drive transistor 13 and determines whether the power receiving device 2 can be supplied with electric power (power supply to the power receiving device 2 is indispensable)

based on the variation of the periodic waveform in the excited voltage excited by the feeding coil 11 which is detected based on a change in electrical connection state of the resonant capacitor 22. The drive control circuit 16 controls the supply of the drive signal to the drive transistor 13 based on a result of the determination. Specifically, the drive control circuit 16 determines based on the variation in peak voltage detected by the crest value variation detection circuit 15 whether the power receiving device 2 can be supplied with electric power (power supply to the power receiving device 2 is indispensable), and controls the supply of the drive signal DRV to the drive transistor 13 based on a result of the determination.

For example, when it is determined that the power receiving device 2 can be supplied with electric power (power supply to the power receiving device 2 is indispensable), the drive control circuit 16 makes the drive signal generation circuit 14 continue the supply of the drive signal DRV, thereby performing continuous drive of the feeding coil 11. Meanwhile, for example, when it is determined that the power receiving device 2 can be supplied with electric power (power supply to the power receiving device 2 is not indispensable), the drive control circuit 16 makes the drive signal generation circuit 14 stop the supply of the drive signal DRV, thereby performing intermittent (non-continuously) drive of the feeding coil 11. The state in which the power receiving device 2 cannot be supplied with electric power (the state in which power supply is impossible) refers to, for example, the case in which there is no power receiving device 2 (including the case in which the feeding coil 11 and the receiving coil 21 are not located at appropriate positions) and the case in which a metallic foreign object is placed on the feeding coil 11.

Specifically, for example, the drive control circuit 16 makes the drive signal generation circuit 14 supply the drive signal DRV to the drive transistor 13 in a predefined detection period (the first period), and makes the crest value variation detection circuit 15 detect the variation in peak voltage. Then, by the determination in this detection period that electric power can be supplied to the power receiving device 2, the drive control circuit 16 makes the drive signal generation circuit 14 continue the supply of the drive signal DRV to the drive transistor 13 for a predefined power supply period (the second period) after the detection period, to thereby continuously drive the feeding coil 11. By the determination in this detection period that electric power cannot be supplied to the power receiving device 2, the drive control circuit 16 makes the drive signal generation circuit 14 stop the supply of the drive signal DRV to the drive transistor 13 in the power supply period after the detection period, to thereby intermittently drive the feeding coil 11.

The power receiving device 2 includes the receiving coil 21, the resonant capacitor 22, a resonance control transistor 23, a rectifier diode 24, a smoothing capacitor 25, and a resonance control circuit 30. Further, the power receiving device 2 supplies electric power received from the power feeding device 1 to the load 26. In this case, the resonant capacitor 22, the resonance control transistor 23, the rectifier diode 24, the smoothing capacitor 25, and the resonance control circuit 30 are included in the power receiving circuit 40.

The receiving coil 21 has a first terminal connected to a node N2, and a second terminal connected to a power supply GND1. The receiving coil 21 is a coil which receives electric power from the feeding coil 11 included in the power feeding device 1 through, for example, electromagnetic induction or electromagnetic coupling. In supplying electric power to the load 26, the receiving coil 21 is arranged in the vicinity of the feeding coil 11 in the positional relationship as illustrated in FIG. 1 and FIG. 2 described above.

The resonant capacitor 22 is a capacitor that is connected in parallel to the receiving coil 21 via the resonance control transistor 23 and resonates with the receiving coil 21. The resonant capacitor 22 is connected between the node N2 and a node N3.

The receiving coil 21, the resonant capacitor 22, and the resonance control transistor 23 form the resonant circuit 20. The resonant circuit 20 resonates at a predetermined resonant frequency (for example, 100 kHz) determined by an inductance of the receiving coil 21 and a capacitance of the resonant capacitor 22. In the first embodiment, the resonant frequency of the power receiving device 2 and the resonant frequency of the power feeding device 1 are equal to each other, for example, 100 kHz.

The resonance control transistor 23 (an example of a first switching element) is a switching element to switch the resonant circuit 20 between the resonant state and the non-resonant state by changing an electrical connection state of the resonant capacitor 22. The resonance control transistor 23 is connected in parallel to the receiving coil 21 together with the resonant capacitor 22, and is connected in series to the resonant capacitor 22. The resonance control transistor 23 is, for example, an NMOS transistor, and has a source terminal connected to the power supply GND1, and a drain terminal connected to the node N3. The resonance control transistor 23 has a gate terminal connected to an output signal line of the resonance control circuit 30 which is described later. The ON state of the resonance control transistor 23 caused by the resonance control circuit 30 activates the resonant capacitor 22 to start resonance in the resonant circuit 20. The OFF state of the resonance control transistor 23 caused by the resonance control circuit 30 electrically disconnect the resonant capacitor 22 to stop the resonance of the resonant circuit 20.

The rectifier diode 24 has an anode terminal connected to the ode N2 corresponding to one terminal of the receiving coil 21, and a cathode terminal connected to a node N4 corresponding to one terminal of the smoothing capacitor 25. The rectifier diode 24 rectifies electric power received by the receiving coil 21, and converts the rectified electric power into DC electric power. Specifically, the rectifier diode 24 converts AC electric power (AC voltage) generated in the receiving coil 21 into DC electric power (DC voltage), to thereby supply electric power to the load 26.

The smoothing capacitor 25 smooths the DC electric power obtained through the conversion by the rectifier diode 24.

The load 26 includes, for example, various circuits, a drive circuit, or a circuit configured to charge a storage battery or a secondary battery contained in the electronic device 3, and is operated or charged with a DC voltage rectified by the rectifier diode 24.

The resonance control circuit 30 controls the resonant state of the resonant circuit 20 by controlling the resonance control transistor 23. The resonance control circuit 30 controls the resonance control transistor 23 based on received power which is received by the receiving coil 21 from the feeding coil 11, and consumed power which is consumed by the load 26 that is supplied with the received power. The resonance control circuit 30 controls the resonance control transistor 23, for example, based on a voltage of a supply line (voltage of the node N4) through which the received power which is received by the receiving coil 21 and rectified is supplied to the load 26. The voltage of the supply line (voltage of the node N4) varies depending on the received power and the power consumption of the load 26. The control of the resonance control transistor 23 based on the voltage of the supply line (voltage of the node N4) is therefore an example of the control of the resonance control transistor 23 based on the received power and the power consumption of the load 26.

The resonance control circuit 30 controls the resonance control transistor 23 so that the resonant circuit 20 is set to the resonant state, for example, in the condition that the voltage of the supply line (voltage of the node N4) is equal to or less than a predetermined threshold voltage. Meanwhile, the resonance control circuit 30 controls the resonance control transistor 23 so that the resonant circuit 20 is set to the non-resonant state, for example, in the condition that the voltage of the supply line (voltage of the node N4) is more than the predetermined threshold voltage. The resonance control circuit 30 thereby controls the resonance control transistor 23 so that a variation of the periodic waveform occurs in an excited voltage of the feeding coil 11 by switching between the resonant state and the non-resonant state of the resonant circuit 20 when power supply to the device (power receiving device 2 or electronic device 3) is indispensable.

Further, the resonance control circuit 30 includes a resistor 31, a resistor 32, a comparator 33, and a reference power supply 34.

The resistor 31 has a first terminal connected to the node N4, and a second terminal connected to a node N5. Further, the resistor 32 has a first terminal connected to the node N5, and a second terminal connected to the GND1 terminal. The resistor 31 and the resistor 32 are connected in series between the node N4 and the GND1 terminal. Through the resistor 31 and the resistor 32, a voltage which is obtained by decreasing the voltage of the node N4 by voltage division at a ratio between resistance of the resistor 31 and the resistor 32 is provided to the node N5.

The comparator 33 has a positive input terminal connected to the reference power supply 34, and a negative input terminal connected to the node N5. The comparator 33 compares the voltage of the node N5 and an output voltage of the reference power supply 34 to each other and turns on the resonance control transistor 23 when the voltage of the node N5 is equal to or less than the output voltage of the reference power supply 34. The comparator 33 turns off the resonance control transistor 23 when the voltage of the node N5 is larger than the output voltage of the reference power supply 34. Further, the reference power supply 34 is a constant voltage source configured to provide a predetermined threshold voltage.

In this manner, the comparator 33 determines whether the resonant circuit 20 is set to the non-resonant state (whether the resonance control transistor 23 is set to the OFF state) based on the received power and the consumed power which is to be consumed by the load 26 that is supplied with the received power. The resonance control circuit 30 thereby causes a variation of the periodic waveform to occur in an excited voltage by switching between the resonant state and the non-resonant state of the resonant circuit 20 when power supply to the power receiving device 2 is indispensable.

Next, the operation of the power feeding system 100 according to the first embodiment is described with reference to the drawings.

Figure 4:
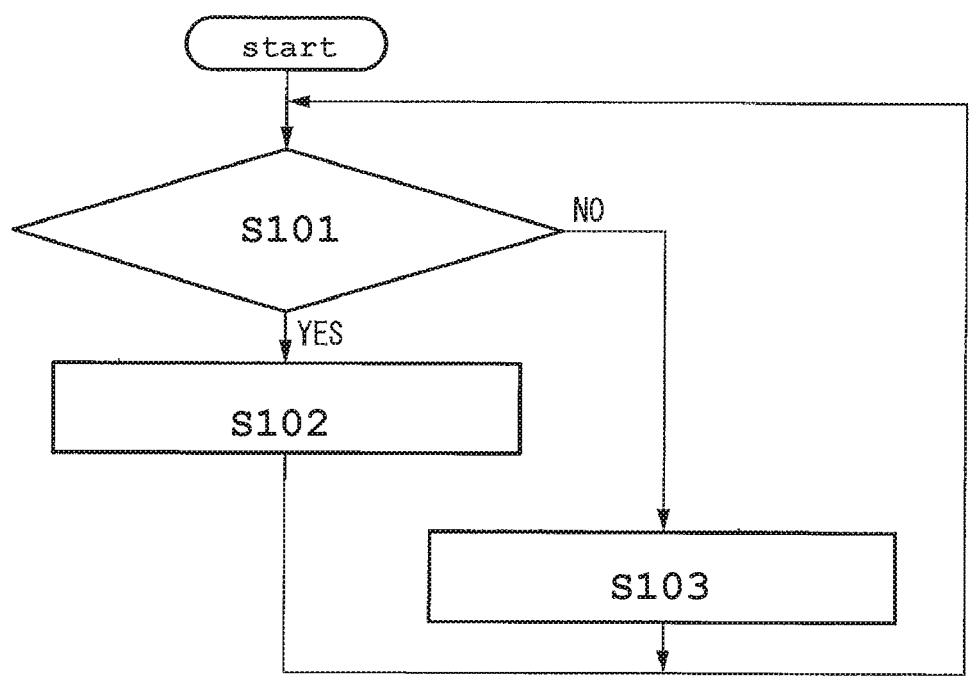
FIG. 4 is a flowchart for illustrating an example of resonance control processing of the power receiving device in the first embodiment.

FIG. 4 is a flowchart for illustrating an example of resonance control processing of the power receiving device 2 in the first embodiment.

In FIG. 4, when electric power is wirelessly (in a non-contact manner) supplied from the feeding coil 11 of the power feeding device 1 to the receiving coil 21 of the power receiving device 2, the power receiving device 2 determines whether the voltage of the node N4 (receiving voltage) is equal to or less than a predetermined threshold voltage (Step S101). Specifically, in the resonance control circuit 30 of FIG. 3 the voltage of the node N4 (receiving voltage) is divided by the resistor 31 and the resistor 32, and the comparator 33 compares the resistor-divided voltage (voltage of the node N5) with the output voltage of the reference power supply 34 to determine whether the voltage of the node N4 (receiving voltage) is equal to or less than the predetermined threshold voltage.

In the condition that the voltage of the node N4 (receiving voltage) is equal to or less than the predetermined threshold voltage (Step S101: YES), the resonance control circuit 30 turns on the resonance control transistor 23 (Step S102). That is, the resonance control circuit 30 provides a high-level to the gate terminal of the resonance control transistor 23. The resonance control transistor 23 is thereby set to the ON state, and the resonant capacitor 22 is electrically connected to the resonant circuit 20.

In the condition that the voltage of the node N4 (receiving voltage) is larger than the predetermined threshold voltage (Step S101: NO), the resonance control circuit 30 turns off the resonance control transistor 23 (Step S103). That is, the resonance control circuit 30 provides a low-level to the gate terminal of the resonance control transistor 23. The resonance control transistor 23 is thereby set to the OFF state, and the resonant capacitor 22 is electrically disconnected from the resonant circuit 20.

After carrying out Step S102 or Step S103, the resonance control circuit 30 returns the flow to the processing of Step S101 and repeats the processing of Step S101 to Step S103.

As described above, the resonance control circuit 30 performs control of switching the resonant state of the resonant circuit 20. That is, the resonance control circuit 30 controls the resonant circuit 20 to be periodically switched between the resonant state and the non-resonant state. The voltage of the feeding coil 11 of the power feeding device 1 is hence observed as a periodic variation as shown in FIG. 5.

Figure 5:
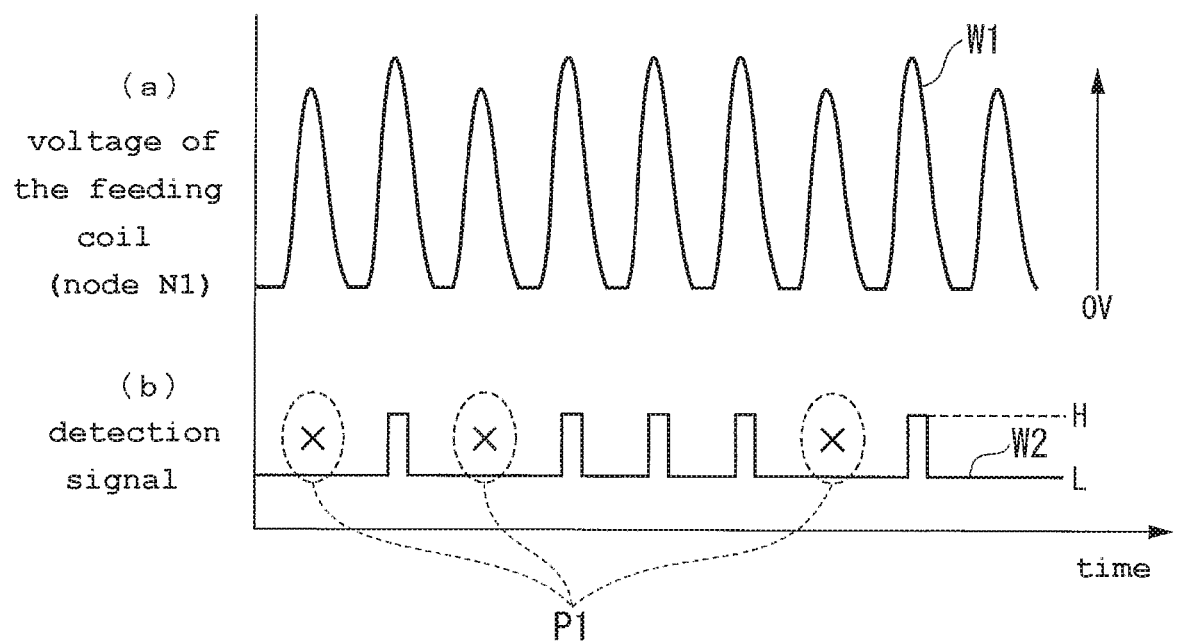
FIG. 5 is a graph for showing an example of a voltage of the feeding coil and a detection signal of a crest value variation detection circuit in a case in which electric power can be supplied to the power receiving device.

FIG. 5 is a graph for showing an example of a voltage of the feeding coil 11 and a detection signal of the crest value variation detection circuit 15 in the condition that the electric power can be supplied to the power receiving device 2.

In FIG. 5, a waveform W1 and a waveform W2 are (a) a waveform of the voltage of the feeding coil 11 (voltage of the node N1) and (b) a waveform of the detection signal of the crest value variation detection circuit 15 in the order from above. The vertical axis of each waveform represents voltage in (a) and logic state in (b). Further, the horizontal axis represents time.

The example shown in FIG. 5 corresponds to the case in which electric power can be supplied to the power receiving device 2 (case in which power supply to the power receiving device 2 is indispensable). The resonant circuit 20 of the power receiving device 2 is switched between the resonant state and the non-resonant state, and hence the peak voltage of the voltage of the feeding coil 11 varies as shown in the waveform W1.

As described above, when the peak voltage is low (see points P1 of the waveform W2), the crest value variation detection circuit 15 does not provide a pulse signal for the detection signal as shown in the waveform W2.

Figure 6:
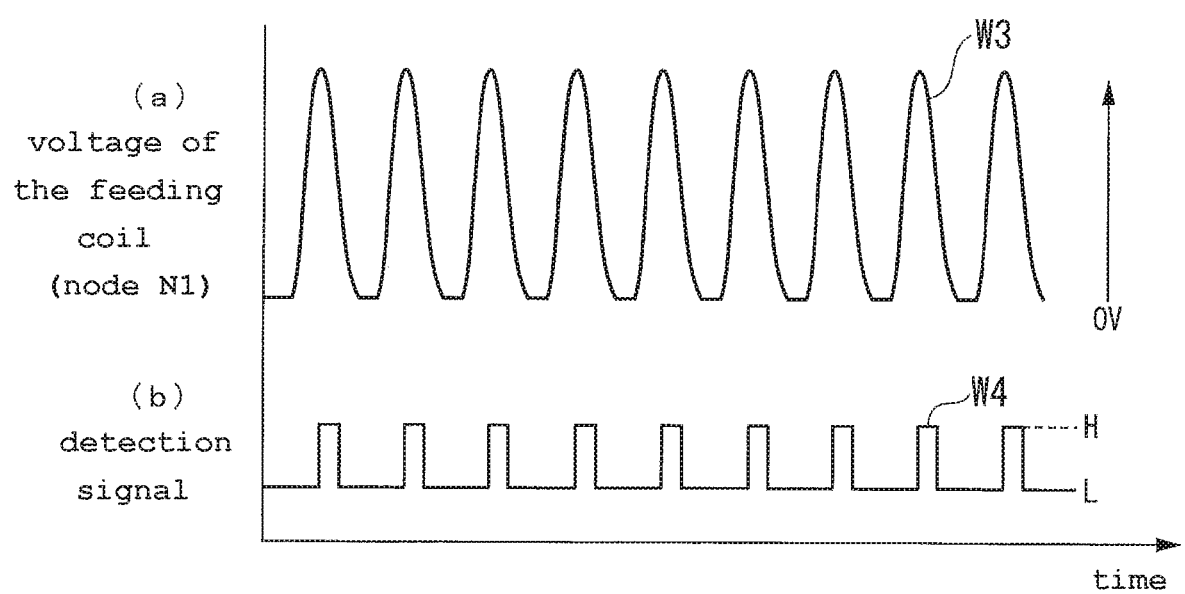
FIG. 6 is a graph for showing an example of a voltage of the feeding coil and a detection signal of the crest value variation detection circuit in a case in which electric power cannot be supplied to the power receiving device.

Further, FIG. 6 is a graph for showing an example of a voltage of the feeding coil 11 and a detection signal of the crest value variation detection circuit 15 in the condition that electric power cannot be supplied to the power receiving device 2 (power supply to the power receiving device 2 is not indispensable).

In FIG. 6, a waveform W3 and a waveform W4 are (a) a waveform of the voltage of the feeding coil 11 (voltage of the node N1) and (b) a waveform of the detection signal of the crest value variation detection circuit 15 in the order from above. The vertical axis of each waveform represents voltage in (a) and logic state in (b). Further, the horizontal axis represents time.

The example shown in FIG. 6 corresponds to, for example, the case in which a metallic foreign object is placed on the feeding coil 11 or the case in which the electric power cannot be supplied to the power receiving device 2. Since the resonant state of the resonant circuit 20 of the power receiving device 2 is not switched, the peak voltage of the voltage of the feeding coil 11 does not vary as shown by the waveform W3.

The crest value variation detection circuit 15 hence always provides a pulse signal in the detection signal as shown by the waveform W4.

As described above, the power feeding device 1 in the first embodiment can determine whether the power receiving device 2 can receive electric power (power supply to the power receiving device 2 is indispensable) based on a variation in peak voltage in the voltage of the feeding coil 11. The power feeding device 1 switches drive mode of the feeding coil 11 between continuous drive and intermittent drive based on the determination results.

Since the power feeding system 100 according to the first embodiment determines whether the power receiving device 2 can receive electric power by detecting a variation in voltage of the feeding coil 11, it is not indispensable to provide, for example, large-scale dedicated transmitting circuit and receiving circuit configured to transmit or receive a signal for detection of a foreign object from a power receiving side to a power feeding side. Further, in the power feeding system 100, it is not indispensable to provide dedicated paths for transmission and reception of the signal, such as a transmission coil and a reception coil.

Next, drive control processing of the power feeding device 1 in the first embodiment is described with reference to FIG. 7 and FIG. 8.

Figure 7:
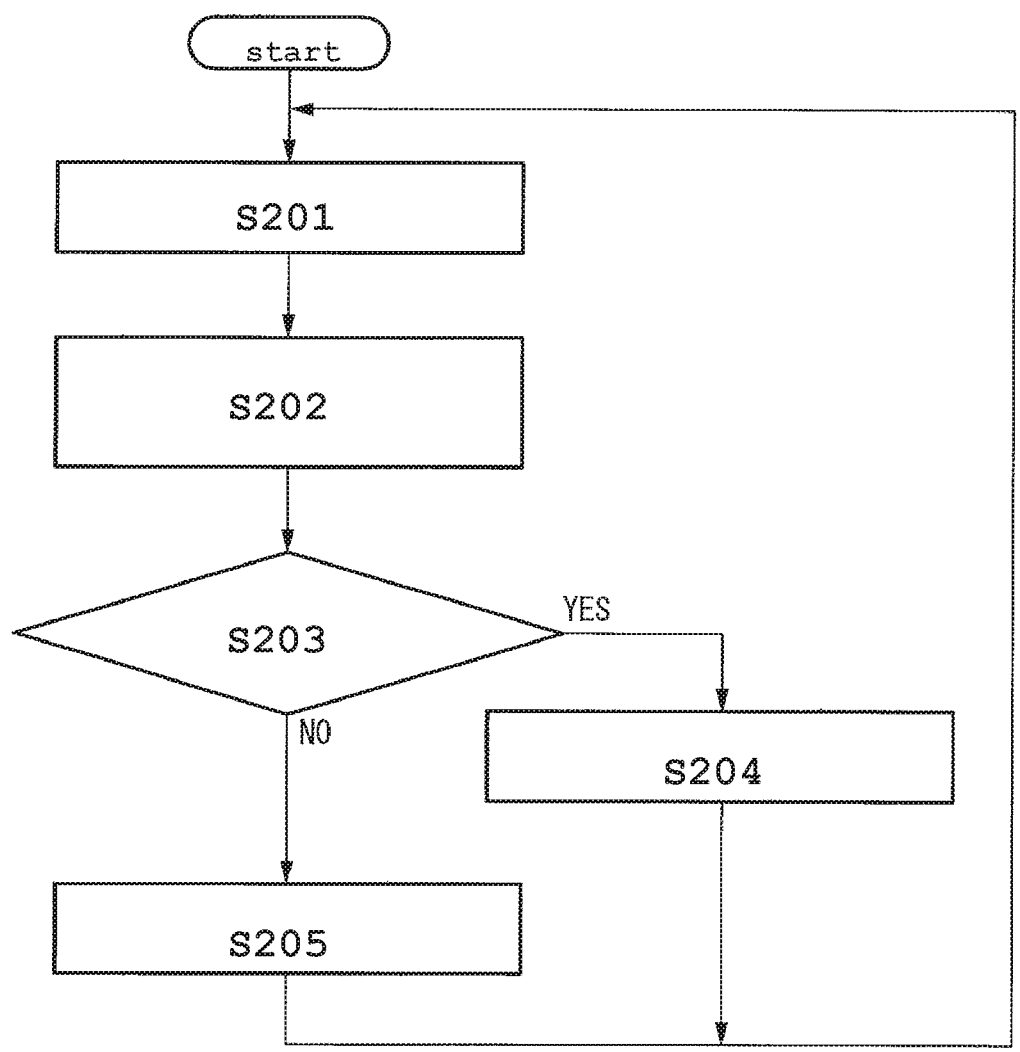
FIG. 7 is a flowchart for illustrating an example of drive control processing of a power feeding device in the first embodiment.

FIG. 7 is a flowchart for illustrating an example of the drive control processing of the power feeding device 1 in the first embodiment.

In FIG. 7, first, the power feeding device 1 performs control so that the drive signal DRV is supplied to the drive transistor 13 (Step S201). Specifically, the drive control circuit 16 of the power feeding device 1 makes the drive signal generation circuit 14 supply the drive signal DRV to the gate terminal of the drive transistor 13. The drive signal generation circuit 14 thereby periodically switches the drive transistor 13 between the ON state and the OFF state and supplies the drive signal DRV for driving the feeding coil 11 to the drive transistor 13.

Next, the drive control circuit 16 acquires the detection results of the variation in peak voltage of the voltage of the feeding coil 11 (Step S202). That is, the crest value variation detection circuit 15 detects the variation in peak voltage, and the drive control circuit 16 acquires the detection results of the variation in peak voltage detected by the crest value variation detection circuit 15.

Next, the drive control circuit 16 determines whether a variation is included in peak voltage (Step S203). When a variation is included in peak voltage (Step S203: YES), the drive control circuit 16 continues the supply of the drive signal DRV to the drive transistor 13 (Step S204). That is, the drive control circuit 16 makes the drive signal generation circuit 14 continue providing the drive signal DRV. After the processing in Step S204, the drive control circuit 16 returns the flow to Step S201 after an elapse of a power supply period. The power feeding device 1 thereby continuously drives the feeding coil 11.

Meanwhile, when no variation is included in peak voltage (Step S203: NO), the drive control circuit 16 stops the supply of the drive signal DRV to the drive transistor 13 (Step S205). That is, the drive control circuit 16 makes the drive signal generation circuit 14 stop providing the drive signal DRV. After the processing in Step S205, the drive control circuit 16 returns the flow to Step S201 after an elapse of the power supply period. The power feeding device 1 thereby intermittently drives the feeding coil 11.

Figure 8:
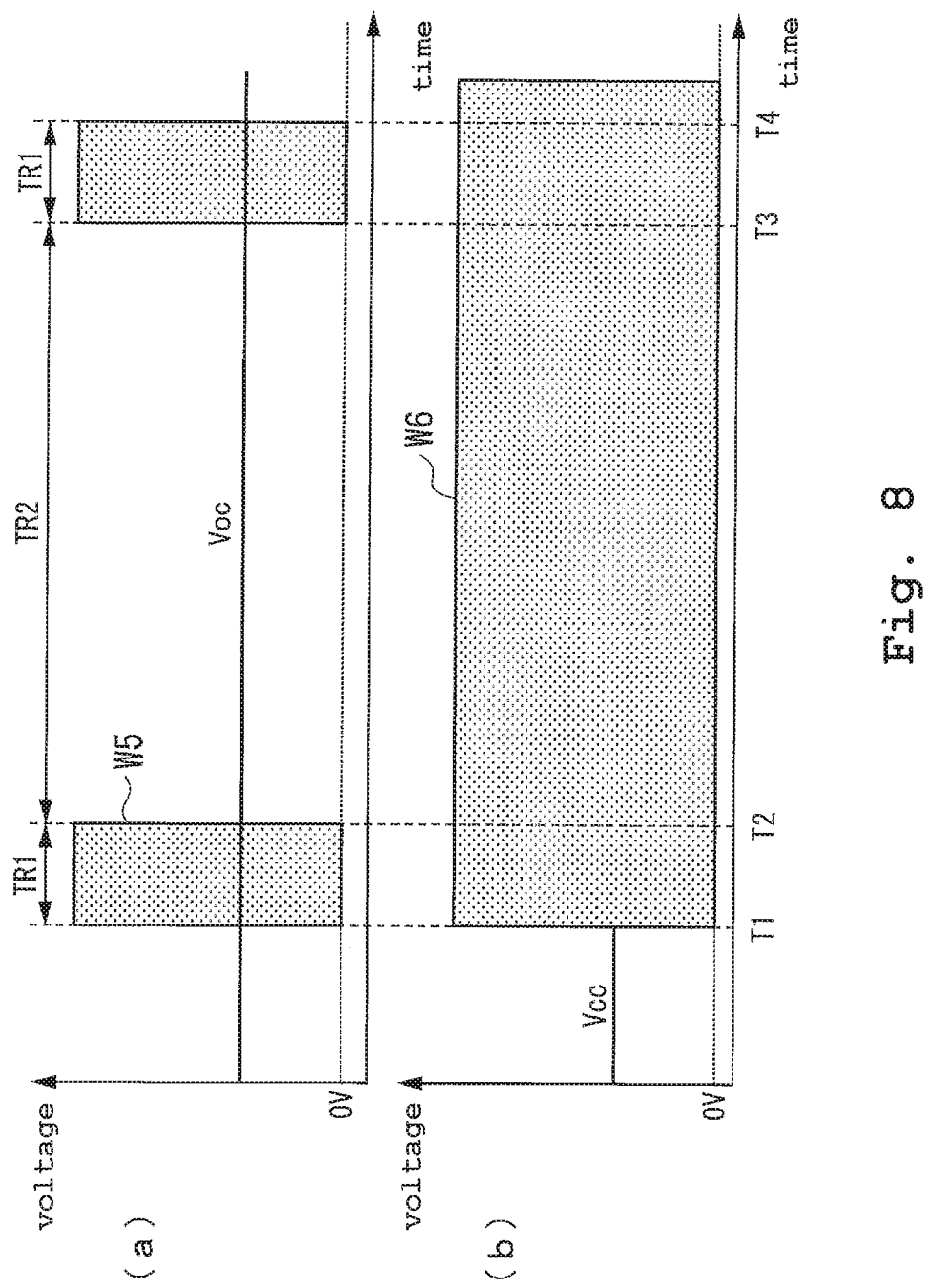
FIG. 8 is a timing chart for illustrating an example of operation of the power feeding device in the first embodiment.

Further, FIG. 8 is a timing chart for illustrating an example of the operation of the power feeding device 1 in the first embodiment.

In FIG. 8, a waveform W5 and a waveform W6 are (a) a waveform of the voltage of the feeding coil 11 in the condition that the power receiving device 2 is not provided or when power supply to the power receiving device 2 is not indispensable, and (b) a waveform of the voltage of the feeding coil 11 in the condition that the power receiving device 2 is provided or when power supply to the power receiving device 2 is indispensable. In this case, the vertical axis of each waveform represents voltage, and the horizontal axis represents time.

Further, in FIG. 8, period TR1 from time T1 to time T2 (and from time T3 to time T4) corresponds to a detection period (first period), and period TR2 from time T2 to time T3 corresponds to a power supply period (second period).

As shown by the waveform W5 in (a) of FIG. 8, the drive control circuit 16 of the power feeding device 1 supplies the drive signal DRV to the drive transistor 13 to drive the feeding coil 11 in the detection period (period TR1) from time T1 to time T2. In this case, there is no power receiving device 2 or power supply to the power receiving device 2 is not indispensable, and hence the drive control circuit 16 does not detect a periodic peak voltage variation in the voltage of the feeding coil 11 in the detection period (period TR1). The drive control circuit 16 therefore stops the supply of the drive signal DRV to the drive transistor 13 to intermittently drive the feeding coil 11 during period TR2 from time T2 to time T3. While the supply of the drive signal DRV is stopped, the voltage of the feeding coil 11 becomes voltage Vcc of the power supply VCC.

In contrast, in the example illustrated in (b) of FIG. 8, there is the power receiving device 2 or power supply to the power receiving device 2 is indispensable, and hence, as shown by the waveform W6, the drive control circuit 16 detects a periodic peak voltage variation in the voltage of the feeding coil 11 in the detection period (period TR1). The drive control circuit 16 therefore continues the supply of the drive signal DRV to the drive transistor 13 as shown by the waveform W6 to continuously drive the feeding coil 11 during period TR2 (power supply period) from time T2 to time T3.

In a case where two power receiving devices 2 are arranged with respect to the power feeding device 1 as illustrated in FIG. 1 and FIG. 2, a variation in waveform of the voltage of the feeding coil 11 is detected when at least one of the two power receiving devices 2 requires power supply. In this case, in period TR2 (power supply period) from time T2 to time T3, as shown by the waveform W6, the drive control circuit 16 continuously supplies the drive signal DRV to the drive transistor 13 to continuously drive the feeding coil 11, to thereby supply electric power to one or both of the two power receiving devices 2.

Further, when none of the two power receiving devices 2 requires power supply, a variation in waveform of the voltage of the feeding coil 11 is not detected. In this case, in period TR2 (power supply period) from time T2 to time T3, as shown by the waveform W5, the drive control circuit 16 stops supply of the drive signal DRV to the drive transistor 13 to intermittently drive the feeding coil 11.

As described above, the power feeding system 100 according to the first embodiment includes the power feeding device 1 and the power receiving device 2 and supplies electric power from the power feeding device 1 to the power receiving device 2 through electromagnetic induction.

The power feeding device 1 includes the feeding coil 11 which is a winding coil, the drive transistor 13 (first switching element), and the drive control circuit 16. The drive transistor 13 is connected in series to the feeding coil 11 and is periodically switched between the conductive state and the non-conductive state with the drive signal for driving the feeding coil 11. The drive control circuit 16 determines whether power supply to the power receiving device 2 is indispensable based on a variation of the periodic waveform in an excited voltage excited by the feeding coil 11, and controls supply of the drive signal DRV to the drive transistor 13 based on a result of the determination.

Further, the power receiving device 2 includes the resonant circuit 20 and the resonance control circuit 30. The resonant circuit 20 includes the receiving coil 21 which is a solenoid coil including the bar-shaped ferrite core 212 (bar-shaped magnetic core) and receives electric power from the feeding coil 11, the resonant capacitor 22 configured to resonate with the receiving coil 21, and the resonance control transistor 23 (second switching element) configured to perform control of switching between the resonant state and the non-resonant state of the resonant circuit by changing an electrical connection state of the resonant capacitor 22. The resonance control circuit 30 controls the resonance control transistor 23 so that the variation of the periodic waveform occurs in the excited voltage by switching between the resonant state and the non-resonant state of the resonant circuit 20 when power supply to the device (power receiving device 2) is indispensable.

The feeding coil 11 and the receiving coil 21 are arranged so that the central axis C1 of the feeding coil 11 and the central axis C2 of the receiving coil 21 are orthogonal to each other, and the winding portion of the solenoid coil (winding portion 211) is prevented from being positioned in a region of a magnetic flux parallel to the central axis C1 of the feeding coil 11 which is generated by the feeding coil 11.

As described above, the power feeding system 100 according to the first embodiment employs the solenoid coil including the bar-shaped ferrite core 212 (bar-shaped magnetic core) as the receiving coil 21, and electric power can be supplied from the feeding coil 11 to the plurality of receiving coils 21 by arranging the feeding coil 11 and the receiving coils 21 so that the central axis C1 of the feeding coil 11 is orthogonal to the central axis C2 of each of the receiving coils 21. Thus, in the power feeding system 100 according to the first embodiment, the power feeding device 1 is not necessary to have complicated configurations such as the position detecting function for the power receiving device 2 and the moving mechanism for the feeding coil 11, and electric power can be simultaneously supplied to the plurality of power feeding devices 2. As described above, the power feeding system 100 according to the first embodiment can simultaneously supply electric power to the plurality of power receiving devices 2 with a simple configuration.

Further, in the power feeding system 100 according to the first embodiment, the drive control circuit 16 determines whether power supply to the power receiving device 2 is indispensable based on the variation of the periodic waveform in the excited voltage excited by the feeding coil 11, and controls supply of the drive signal DRV to the drive transistor 13 based on a result of the determination. In the power feeding system 100 according to the first embodiment, power supply can be thereby automatically stopped, for example, when power supply to the power receiving device 2 is not indispensable based on the variation of the periodic waveform in the excited voltage excited by the feeding coil 11.

Further, in the power feeding system 100 according to the first embodiment, when an aluminum foil was placed on an entire surface of the feeding coil 11, generated heat reached 100° C. or more, and when two aluminum foils each having a size corresponding to a half of the diameter of the feeding coil 11 were placed on the feeding coil 11, generated heat reached about 70° C. Further, for example, when a metal washer was placed on the feeding coil 11, generated heat reached about 60° C. In the power feeding system 100 according to the first embodiment, a region other than the region A1 of the magnetic flux parallel to the central axis C1 of the feeding coil 11 is filled with a magnetic flux substantially parallel to the central axis C2 of the receiving coil 21, and hence a magnetic flux perpendicular to a metal surface (surface of an aluminum foil or the like) placed on the feeding coil 11 can be reduced. The power feeding system 100 according to the first embodiment can therefore reduce heat generation caused by an eddy current due to the magnetic flux perpendicular to the metal surface.

Further, in the first embodiment, the receiving coil 21 is arranged so that the bar-shaped ferrite core 212 and the feeding coil 11 form the magnetic circuit G1 (G2).

With this, the power feeding system 100 according to the first embodiment can efficiently supply electric power from the feeding coil 11 to the receiving coil 21.

Further, in the first embodiment, the power feeding device 1 includes the crest value variation detection circuit 15 (variation detection circuit) configured to detect the variation of the periodic waveform in the excited voltage of the feeding coil 11. The drive control circuit 16 supplies the drive signal DRV to the drive transistor 13 in a preset first period (period TR1) to cause the crest value variation detection circuit 15 to detect the variation of the periodic waveform, and continues, when determining that the power supply to the power receiving device 2 is indispensable in the preset first period, the supply of the drive signal DRV to the resonance control transistor 23 in a preset second period (period TR2) after the preset first period, to thereby continuously drive the feeding coil 11. Further, the drive control circuit 16 stops, when determining that the power supply to the power receiving device 2 is not indispensable in the preset first period, the supply of the drive signal DRV to the drive transistor 13 in the preset second period, to thereby intermittently drive the feeding coil 11. In addition, the drive control circuit 16 generates the preset first period and the preset second period alternately and regularly.

The power feeding system 100 according to the first embodiment thereby intermittently drives the feeding coil 11, for example, when a metallic foreign object is placed on the feeding coil 11. Heat generation caused by the metallic foreign object can therefore be appropriately suppressed, and power supply can be automatically stopped when power supply to the power receiving device 2 is not indispensable. Further, the power feeding system 100 according to the first embodiment intermittently drives the feeding coil 11, for example, when power supply to the power receiving device 2 is not indispensable, and hence standby power of the power feeding device 1 can be reduced.

Further, the power feeding method according to the first embodiment is a power feeding method for the power feeding system 100 configured to supply electric power from the power feeding device 1 to the power receiving device 2 through electromagnetic induction. The power feeding device 1 includes the feeding coil 11 and the drive transistor 13 which is connected in series to the feeding coil 11 and is periodically switched between a conductive state and a non-conductive state with a drive signal for driving the feeding coil 11 and the power receiving device 2 includes the resonant circuit 20.

The power feeding method includes an arrangement step, a drive control step, and a resonance control step. In this case, the resonant circuit 20 includes the receiving coil 21 which is a solenoid coil including the bar-shaped ferrite core 212 and receives the electric power from the feeding coil 11, the resonant capacitor 22 configured to resonate with the receiving coil 21, and the resonance control transistor 23 configured to perform control of switching between a resonant state and a non-resonant state of the resonant circuit 20 by changing an electrical connection state of the resonant capacitor 22.

In the arrangement step, the feeding coil 11 and the receiving coil 21 are arranged so that the central axis C1 of the feeding coil 11 and the central axis C2 of the receiving coil 21 are orthogonal to each other, and the winding portion of the solenoid coil (winding portion 211) is prevented from being positioned in the region of the magnetic flux parallel to the central axis C1 of the feeding coil 11 which is generated by the feeding coil 11.

In the drive control step, the power feeding device 1 determines whether or not power supply to the power receiving device 2 is indispensable based on the variation of the periodic waveform in the excited voltage excited by the feeding coil 11 and controls supply of the drive signal to the drive transistor 13 based on a result of the determination.

In the resonance control step, the power receiving device 2 controls the resonance control transistor 23 so that the variation of the periodic waveform occurs in the excited voltage by switching between the resonant state and the non-resonant state of the resonant circuit 20 when power supply to the power receiving device 2 is indispensable.

The power feeding method according to the first embodiment thereby exhibits the same effects as those of the power feeding system 100 and enables electric power to be simultaneously supplied to the plurality of power receiving devices 2 with a simple configuration.

In the first embodiment, description is given of the example of the plate coil as the feeding coil 11, but the same effects are obtained even with coils having other forms as long as there is a winding on the periphery of the central axis C1 being a central axis. Further, in the first embodiment, description is given of the example of the ferrite core material as one example of the magnetic core, but materials other than the ferrite core material, such as Sendust and Permalloy, may be used as long as the material has the same function.

Second Embodiment

Next, a power feeding system 100a according to a second embodiment of the present invention is described with reference to the drawings.

Figure 9:
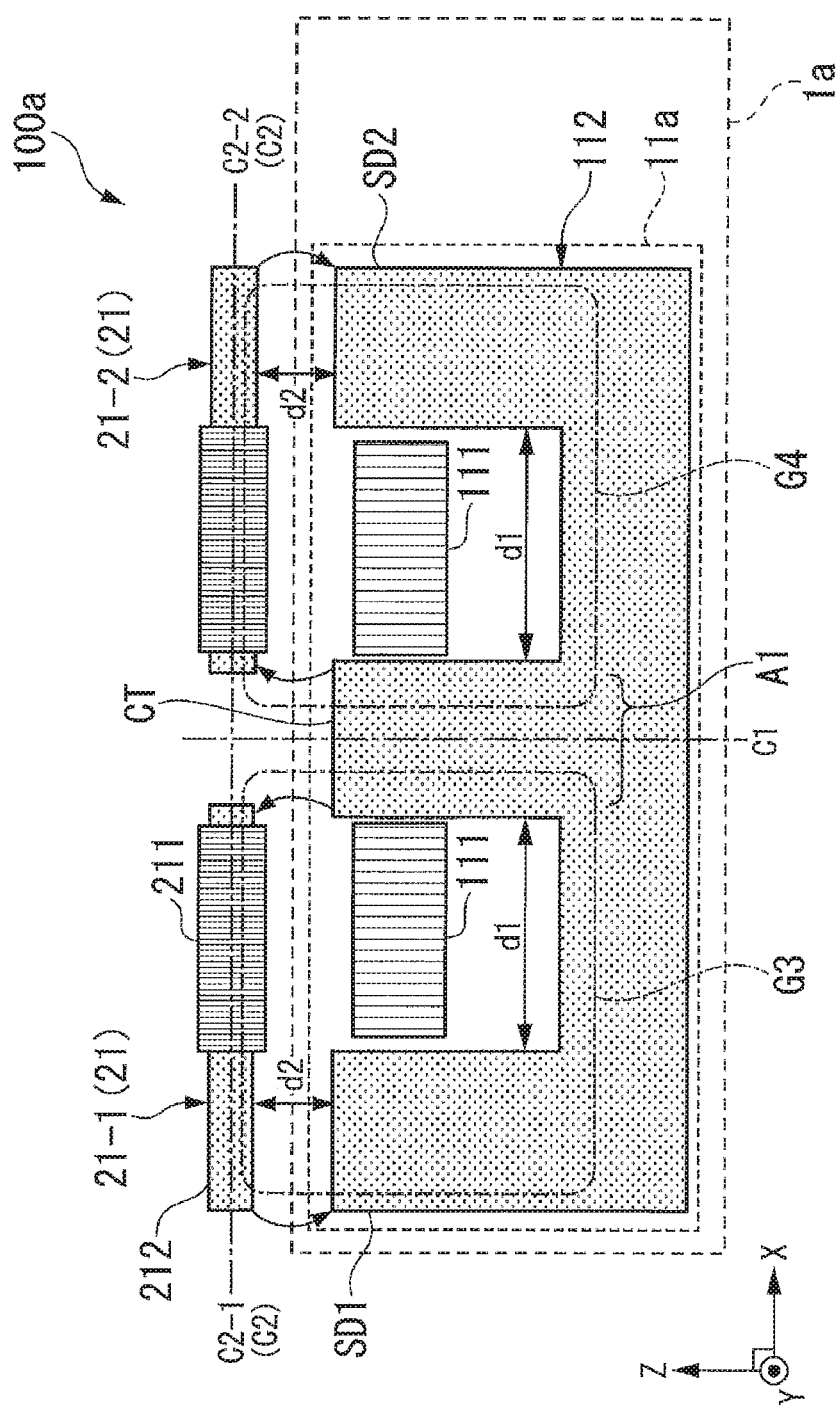
FIG. 9 is a configuration view for illustrating an example of a power feeding system according to a second embodiment of the present invention.

FIG. 9 is a configuration view for illustrating an example of the power feeding system 100a according to the second embodiment.

The power feeding system 100a illustrated in FIG. 9 includes a power feeding device 1a and two power receiving devices 2, but illustration of the same portions as those in the first embodiment is omitted. For example, illustration of the configurations other than those of the receiving coils 21 (21-1, 21-2) in the two power receiving devices 2 is omitted, and illustration of the configurations other than that of a feeding coil 11a in the power feeding device 1a is omitted.

In the second embodiment, the same configurations as those of the first embodiment are denoted by the same reference symbols, and description thereof is omitted.

In FIG. 9, the power feeding device 1a includes the feeding coil 11a.

The feeding coil 11a includes a winding portion 111 having the central axis C1 as a central axis and an E-type ferrite core 112 (E-type magnetic core). The E-type ferrite core 112 includes a center portion CT around which a winding coil is wound and two side wall portions (SD1, SD2) arranged on an outer side of the center portion CT.

Further, in the second embodiment, the receiving coil 21 is arranged so as to stride across (traverse) the center portion CT and the side wall portion (SD1, SD2). That is, the receiving coil 21 is arranged so that the bar-shaped ferrite core 212 and the E-type ferrite core 112 form a magnetic circuit G3 (G4).

The feeding coil 11a and the receiving coil 21 are arranged so that a distance d2 between the E-type ferrite core 112 and the bar-shaped ferrite core 212 is a half or less of an interval d1 between the center portion CT and the side wall portion SD1 (SD2).

Figure 10:
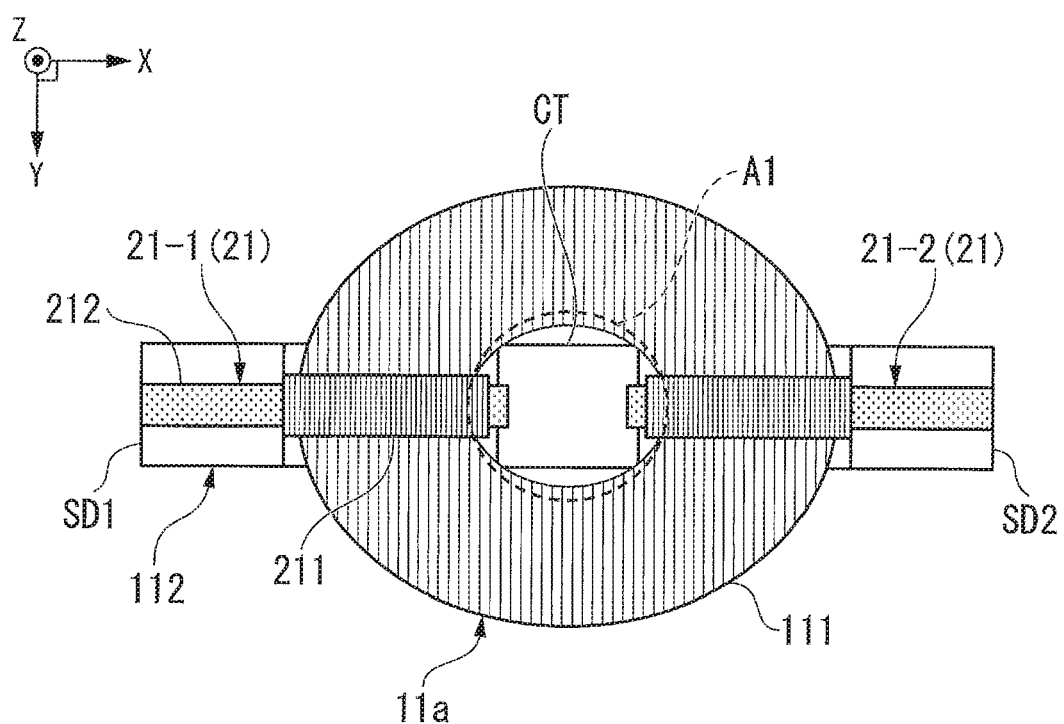
FIG. 10 is a view for illustrating an arrangement example of a feeding coil and receiving coils in the second embodiment.

Further, FIG. 10 is a view for illustrating an arrangement example of the feeding coil 11a and the receiving coils 21 in the second embodiment. In this case, the arrangement of the feeding coil 11a and the receiving coils 21 as viewed from the Z-axis direction is illustrated.

As illustrated in FIG. 10, the receiving coil 21-1 and the receiving coil 21-2 are arranged so that the bar-shaped ferrite cores 212 are positioned radially from the center of the feeding coil 11a and are matched with a direction connecting the center portion CT and the side wall portion SD1 (SD2) of the E-type ferrite core 112 to each other. Further, the receiving coil 21-1 and the receiving coil 21-2 are arranged so that winding portions (winding portions 211) of the solenoids are prevented from being positioned in a region (region A1) of a magnetic flux parallel to the central axis C1 of the feeding coil 11a described above.

The basic operations of the power feeding device 1a and the power receiving devices 2 in the second embodiment are the same as those in the first embodiment illustrated in FIG. 4 to FIG. 8 described above, and hence description thereof is omitted here.

As described above, in the power feeding system 100a according to the second embodiment, the feeding coil 11a includes the E-type ferrite core 112 (E-type magnetic core) including the center portion CT around which a winding coil is wound and the two side wall portions (SD1, SD2) arranged on an outer side of the center portion CT. The receiving coil 21 is arranged so that the bar-shaped ferrite core 212 strides across the center portion CT and the side wall portion (SD1, SD2).

With this, a magnetic flux passes through a region between the E-type ferrite core 112 and the bar-shaped ferrite core 212, and hence the power feeding system 100a according to the second embodiment can further efficiently supply electric power from the feeding coil 11a to the receiving coil 21. Thus, the power feeding system 100a according to the second embodiment can simultaneously and efficiently supply electric power to the plurality of power receiving devices 2 with a simple configuration.

Further, in the power feeding system 100a according to the second embodiment, the path of the magnetic flux is restricted by the E-type ferrite core 112. Accordingly, when a metallic foreign object is placed on the feeding coil 11a, heat generation can be reduced as compared to that in the first embodiment. For example, in the power feeding system 100a according to the second embodiment, when two aluminum foils each having a size corresponding to a half of the diameter of the feeding coil 11a were placed on the feeding coil 11a, heat generation of at about 60° C. occurred. Thus, in the power feeding system 100a according to the second embodiment, heat generation caused by the metallic foreign object can be reduced as compared to that in the first embodiment described above.

Further, in the second embodiment, the feeding coil 21 is arranged so that the bar-shaped ferrite core 212 and the E-type ferrite core 112 form the magnetic circuit G3 (G4).

With this, the power feeding system 100a according to the second embodiment can further efficiently supply electric power from the feeding coil 11a to the receiving coil 21. Further, in the second embodiment, description is given of the E-type ferrite core 112 as an example. However, the present invention is not limited to the case in which the length of the center portion CT of the E-type ferrite core 112 is the same as that of each of the side wall portions SD1 and SD2 of the E-type ferrite core 112, and the length of the center portion CT may be different from the length of each of the side wall portions SD1 and SD2.

Further, in the second embodiment, the feeding coil 11a and the receiving coil 21 are arranged so that the distance d2 between the E-type ferrite core 112 and the bar-shaped ferrite core 212 is a half or less of the interval d1 between the center portion CT and the side wall portion SD1 (SD2). That is, the distance by which the magnetic flux passes through the air through the magnetic circuit G3 (G4) by way of the bar-shaped ferrite core 212 is set to be shorter than the distance by which the magnetic flux passes through a region between the center portion CT and the side wall portion SD1 (SD2).

With this, in the power feeding system 100a according to the second embodiment, the magnetic flux can easily pass through the receiving coil 21 by virtue of the appropriate distance from the feeding coil 11a to the receiving coil 21, and hence electric power can be further efficiently supplied from the feeding coil 11a to the receiving coil 21.

Third Embodiment

Next, a power feeding system 100b according to a third embodiment of the present invention is described with reference to the drawings. In the third embodiment, a modification example of the above-mentioned first embodiment is described.

Figure 11:
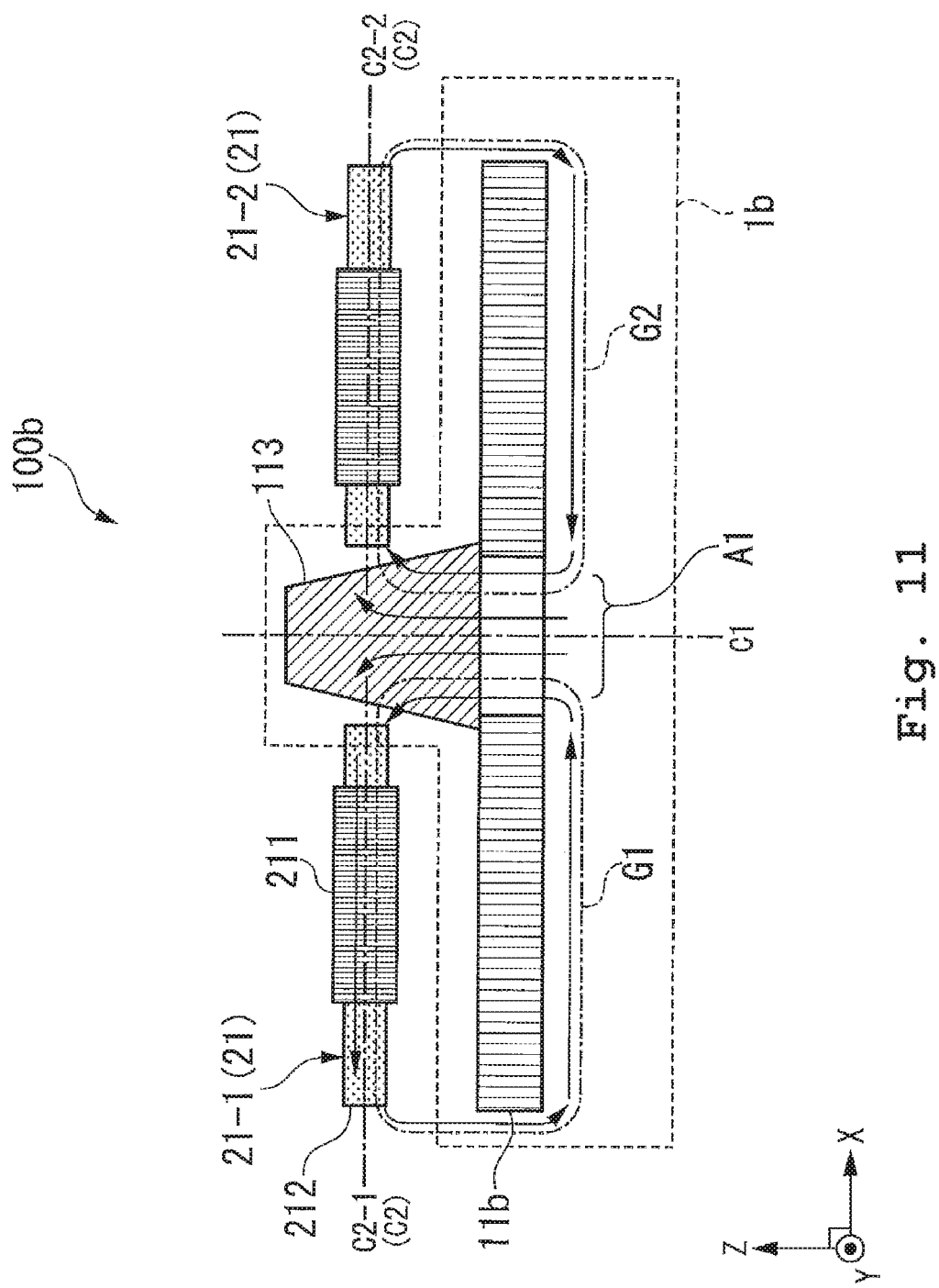
FIG. 11 is a configuration view for illustrating an example of a power feeding system according to a third embodiment of the present invention.

FIG. 11 is a configuration view for illustrating an example of the power feeding system 100b according to the third embodiment.

The power feeding system 100b illustrated in FIG. 11 includes a power feeding device 1b and two power receiving devices 2, but illustration of the same portions as those in the first embodiment is omitted. For example, illustration of the configurations other than those of the receiving coils 21 (21-1, 21-2) in the two power receiving devices 2 is omitted, and illustration of the configurations other than that of a feeding coil 11b and a protruding portion 113 in the power feeding device 1b is omitted.

In the third embodiment, the same configurations as those of the first embodiment are denoted by the same reference symbols, and description thereof is omitted.

As illustrated in FIG. 11, the power feeding device 1b in the third embodiment includes the feeding coil 11b. The feeding coil 11b is, for example, a plate-like winding coil and includes the protruding portion 113. The protruding portion 113 is arranged in a center portion of the feeding coil 11b so that a winding portion (winding portion 211) of a solenoid coil is prevented from being positioned in a region (region A1) of a magnetic flux parallel to the central axis C1 of the feeding coil 11b which is generated by the feeding coil 11b.

The basic operations of the power feeding device 1b and the power receiving devices 2 in the third embodiment are the same as those in the first embodiment illustrated in FIG. 4 to FIG. 8 described above, and hence description thereof is omitted here.

As described above, in the power feeding system 100b according to the third embodiment, the power feeding device 1b includes the protruding portion 113 arranged in the center portion of the feeding coil 11b so that the winding portion (winding portion 211) of the solenoid coil is prevented from being positioned in the region (region A1) of the magnetic flux parallel to the central axis C1 of the feeding coil 11b which is generated by the feeding coil 11b.

With this, in the power feeding system 100b according to the third embodiment, the receiving coil 21 is prevented from being positioned in the region (region A1) of the magnetic flux parallel to the central axis C1 of the feeding coil 11b. The power feeding system 100b can therefore simultaneously and further efficiently supply electric power to the plurality of power receiving devices 2 with a simple configuration.

Fourth Embodiment

Next, a power supply system 100c according to a fourth embodiment of the present invention is described with reference to the drawings. In each of the above-mentioned embodiments, description is given of the example in which the receiving coil 21 includes the bar-shaped ferrite core 212, but the receiving coil 21 may include a ferrite having another shape. In the fourth embodiment, description is given of a modification example in which the receiving coil 21 includes a ferrite having another shape.

Figure 12A:
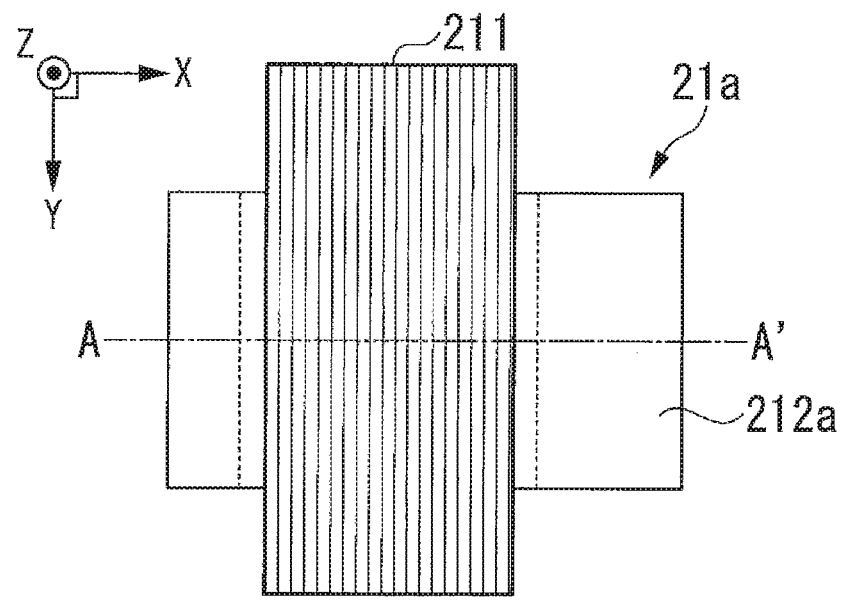
FIG. 12A and FIG. 12B are each a configuration view for illustrating an example of a power receiving coil in a fourth embodiment of the present invention.
Figure 12B:
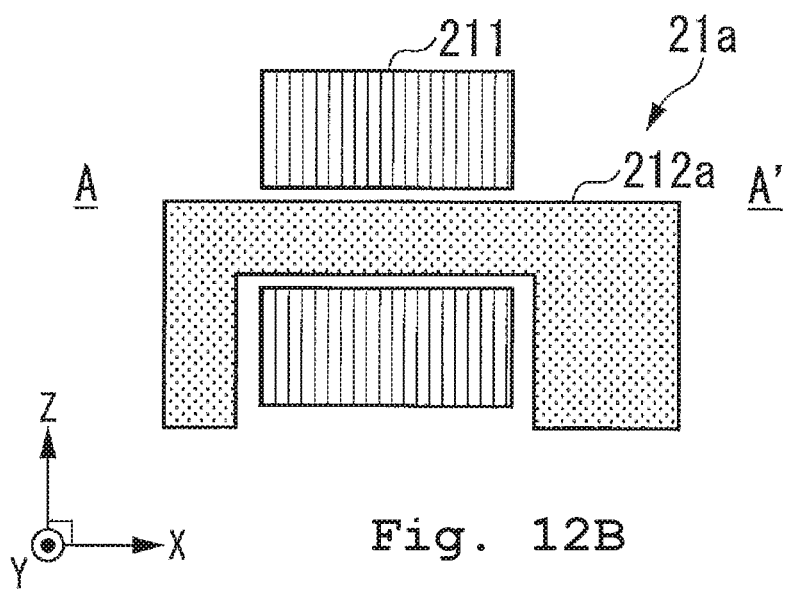

FIG. 12A and FIG. 12B are each a configuration view for illustrating an example of a receiving coil 21a in the fourth embodiment. In this case, FIG. 12A is an external view of the receiving coil 21a as viewed from the Z-axis direction, and FIG. 12B is a sectional view of the receiving coil 21a taken along the line AA' of FIG. 12A.

As illustrated in FIG. 12A and FIG. 12B, the receiving coil 21a includes the winding portion 211 and a U-type ferrite core 212a, which is a U-shaped ferrite core. The receiving coil 21a is the same as that in the second embodiment except that the receiving coil 21a includes the U-type ferrite core 212a instead of the bar-shaped ferrite core 212.

Figure 13:
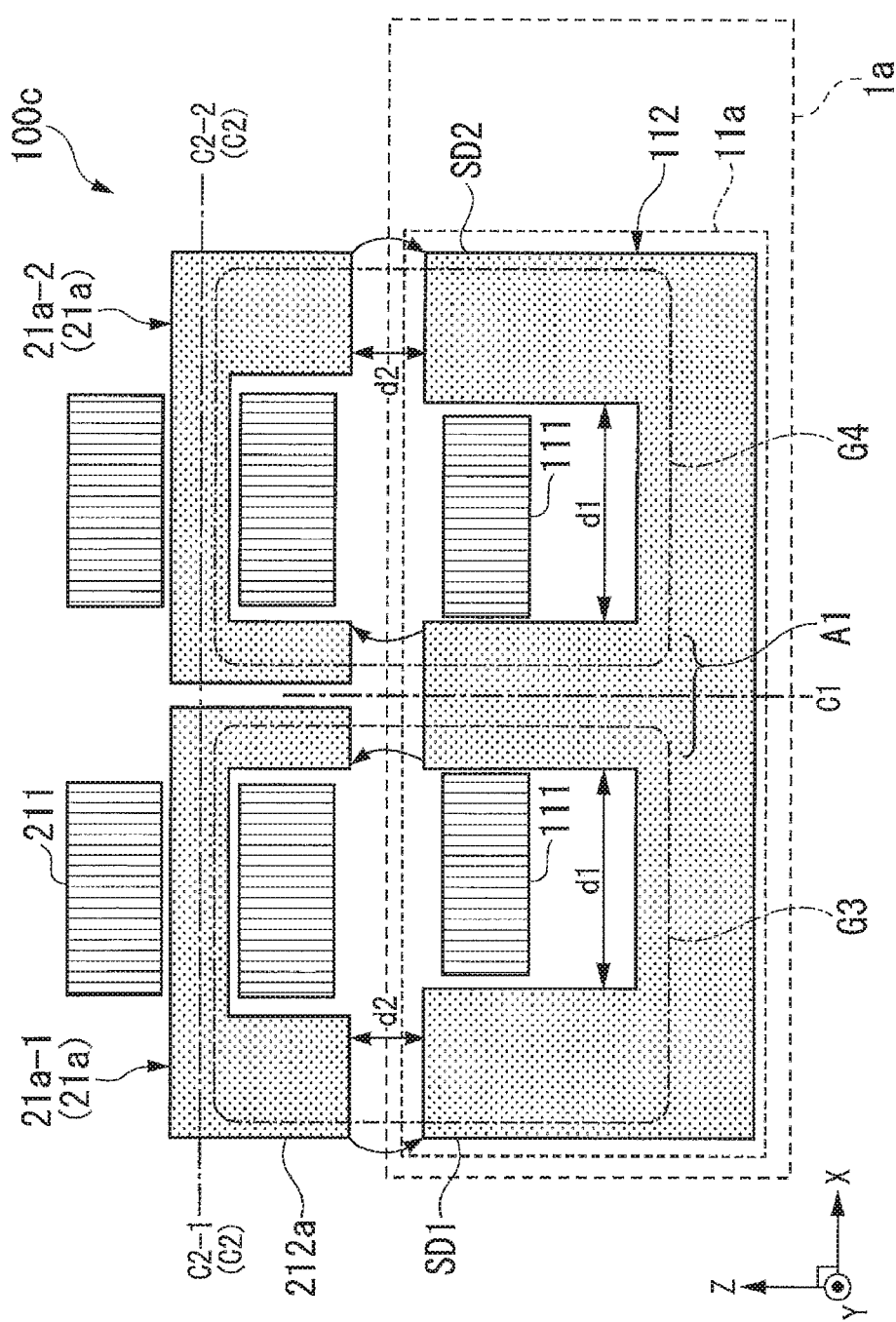
FIG. 13 is a configuration view for illustrating an example of a power feeding system according to a fourth embodiment of the present invention.

Further, FIG. 13 is a configuration view for illustrating an example of the power feeding system 100c according to the fourth embodiment.

The power feeding system 100c illustrated in FIG. 13 includes the power feeding device 1a and two power receiving devices 2, but illustration of the same portions as those in the first embodiment is omitted. The power receiving device 2 in the fourth embodiment includes the receiving coils 21a (21a-1, 21a-2) different from the receiving coils 21 (21-1, 21-2). Illustration of the configurations other than those of the receiving coils 21a (21a-1, 21a-2) is omitted here.

In the fourth embodiment, the same configurations as those of the second embodiment are denoted by the same reference symbols, and description thereof is omitted.

As illustrated in FIG. 13, the power feeding system 100c according to the fourth embodiment includes the above-mentioned two receiving coils 21a (21a-1, 21a-2) and the feeding coil 11a.

The basic operations of the power feeding device 1a and the power receiving devices 2 in the fourth embodiment are the same as those in the first embodiment illustrated in FIG. 4 to FIG. 8 described above, and hence description thereof is omitted here.

As described above, in the power feeding system 100c according to the fourth embodiment, the power receiving device 2 includes the U-type ferrite core 212a (U-type magnetic core) instead of the bar-shaped ferrite core 212.

With this, the power feeding system 100c according to the fourth embodiment can efficiently supply electric power from the feeding coil 11a to the receiving coils 21a in the same manner as in the second embodiment.

The present invention is not limited to the above-mentioned embodiments, and may be changed within the scope not departing from the gist of the present invention.

For example, in each the above-mentioned embodiment, as an example of the variation detection circuit configured to detect the variation of the periodic waveform of the excited voltage of the feeding coil 11 (11a, 11b), description is given of the example using the crest value variation detection circuit 15 configured to detect the peak voltage of the feeding coil 11 (11a, 11b). However, the present invention is not limited thereto. For example, the variation detection circuit may detect the variation of the periodic waveform of the excited voltage of the feeding coil 11 as a variation in waveform frequency of the excited voltage or a variation in waveform cycle of the excited voltage.

Further, in each embodiment described above, as an example in which the resonance control circuit 30 of the receiving device 2 determines whether the resonant circuit 20 is set to the non-resonant state based on the received power and the power consumption of the load 26, description is given of the example of determining whether the resonant circuit 20 is set to the non-resonant state based on the voltage of the supply line (voltage of the node N4) through which the received power after rectification is supplied to the load 26. However, the present invention is not limited thereto. For example, the resonance control circuit 30 may determine whether the resonant circuit 20 is set to the non-resonant state based on a current flowing to the load 26 instead of the voltage of the supply line (voltage of the node N4), or other procedures may be used. For example, when the load 26 is a storage battery (secondary battery), the resonance control circuit 30 may determine whether charge has been completed based on a current flowing into the storage battery or an output voltage of the storage battery, and may not switch between the resonant state and the non-resonant state of the resonant circuit 20 when charge has been completed.

Each configuration included in the power feeding system 100 (100a to 100c) may be implemented by dedicated hardware. Each configuration included in the power feeding system 100 (100a to 100c) may be constructed by a memory and a CPU, and its functions may be implemented by loading a program for implementing each configuration included in the power feeding system 100 (100a to 100c) onto the memory and executing the program.

What is claimed is:

1. A power feeding system, comprising:
a power feeding device; and
a power receiving device,
the power feeding system being configured to supply electric power from the power feeding device to the power receiving device through electromagnetic induction,
the power feeding device comprising:
a feeding coil, the feeding coil being a winding coil;
a first switching element connected in series to the feeding coil, and periodically switched between a conductive state and a non-conductive state with a drive signal for driving the feeding coil; and
a drive control circuit configured to determine whether to supply electric power to the power receiving device based on a variation of a periodic waveform in an excited voltage excited by the feeding coil and to control the first switching element based on a result of the determination,
the power receiving device comprising:
a resonant circuit having:
a receiving coil including a magnetic core, and configured to receive the electric power from the feeding coil;
a resonant capacitor configured to resonate with the receiving coil; and
a second switching element configured to control switching between a resonant state and a non-resonant state of the resonant circuit by changing an electrical connection state of the resonant capacitor; and
a resonance control circuit configured to control the second switching element so that the variation of the periodic waveform occurs in the excited voltage by switching between the resonant state and the non-resonant state of the resonant circuit,
the feeding coil and the receiving coil being arranged so that a central axis of the feeding coil and a central axis of the receiving coil are orthogonal to each other, and a winding portion of the receiving coil is not positioned in a region of a magnetic flux generated by the feeding coil and parallel to the central axis of the feeding coil.

2. The power feeding system according to claim 1, wherein the receiving coil is arranged so that the magnetic core of the receiving coil and the feeding coil form a magnetic circuit.

3. The power feeding system according to claim 1, wherein the feeding coil includes:
an E-type magnetic core having a center portion around which the wiring coil is wound; and
two side wall portions arranged on an outer side of the center portion, and wherein the receiving coil is arranged so that the magnetic core of the receiving coil strides across the center portion and one of the two side wall portions.

4. The power feeding system according to claim 3, wherein the receiving coil is arranged so that the magnetic core of the receiving coil and the E-type magnetic core form a magnetic circuit.

5. The power feeding system according to claim 3, wherein the feeding coil and the receiving coil are arranged so that a distance between the E-type magnetic core and the magnetic core of the receiving coil is a half or less of an interval between the center portion and one of the two side wall portions.

6. The power feeding system according to claim 1, wherein the power feeding device further includes a protruding portion arranged in a center portion of the feeding coil so that the winding portion of the receiving coil is prevented from being positioned in the region of the magnetic flux parallel to the central axis of the feeding coil which is generated by the feeding coil.

7. The power feeding system according to claim 1,
wherein the power feeding device further includes a variation detection circuit configured to detect the variation of the periodic waveform in the excited voltage, and
wherein the drive control circuit is configured to:
supply the drive signal to the first switching element in a preset first period to make the variation detection circuit detect the variation of the periodic waveform;
continue the supply of the drive signal to the second switching element in a preset second period after the preset first period based on determination that the power supply to the power receiving device is indispensable in the preset first period, to thereby continuously drive the feeding coil; and
stop the supply of the drive signal to the first switching element in the preset second period based on determination that the power supply to the power receiving device is not indispensable in the preset first period, to thereby intermittently drive the feeding coil; and generate the preset first period and the preset second period alternately and regularly.

8. A power feeding method for a power feeding system,
the power feeding system including a power feeding device and a power receiving device,
the power feeding system being configured to supply electric power from the power feeding device to the power receiving device through electromagnetic induction,
the power feeding device including:
a feeding coil, the feeding coil being a winding coil; and
a first switching element connected in series to the feeding coil, and periodically switched between a conductive state and a non-conductive state with a drive signal for driving the feeding coil,
the power receiving device including a resonant circuit having:
a receiving coil including a magnetic core, and configured to receive the electric power from the feeding coil;
a resonant capacitor configured to resonate with the receiving coil; and
a second switching element configured to control switching between a resonant state and a non-resonant state of the resonant circuit by changing an electrical connection state of the resonant capacitor,
the power feeding method comprising:
arranging the feeding coil and the receiving coil so that a central axis of the feeding coil and a central axis of the receiving coil are orthogonal to each other, and a winding portion of the receiving coil is not positioned in a region of a magnetic flux generated by the feeding coil and parallel to the central axis of the feeding coil;
causing the power feeding device to determine whether to supply electric power to the power receiving device based on a variation of a periodic waveform in an excited voltage excited by the feeding coil and to control the first switching element based on a result of the determination; and
causing the power receiving device to control the second switching element so that the variation of the periodic waveform occurs in the excited voltage by switching between the resonant state and the non-resonant state of the resonant circuit.

* * * * *